United States Patent Office 3,100,790
Patented Aug. 13, 1963

3,100,790
ISOCYANOARYL ESTERS OF PHOSPHONIC, PHOSPHINIC, THIOPHOSPHONIC, AND THIOPHOSPHINIC ACIDS
Günter Oertel, Cologne-Flittard, and Hans Holtschmidt, Cologne-Stammheim, Germany, assignors to Farbenfabriken Bayer Aktiengesellschaft, Leverkusen, Germany, a corporation of Germany
No Drawing. Filed Mar. 8, 1961, Ser. No. 94,140
Claims priority, application Germany Mar. 12, 1960
7 Claims. (Cl. 260—461)

This invention relates to aromatic isocyanates and more particularly to aromatic phosphorous isocyanates which contain a direct carbon to phosphorous bond.

Aromatic phosphorous isocyanates which contain a direct carbon to phosphorous bond are desirable for the production of flame-resistant plastics. However, there have been no processes available heretofore for the commercial production of such isocyanates.

It is an object of this invention to provide aromatic isocyanates which contain a direct carbon to phosphorous bond. Another object of this invention is to provide an improved process for the preparation of aromatic phosphorous isocyanates. Still another object of this invention is to provide isocyanato derivatives of phosphonic, thiophosphonic, phosphinic, and thiophosphinic acids. Still another object of this invention is to provide isocyanato aryl esters of phosphorous containing acids which will impart flame retarding properties to plastics.

The foregoing objects and others which will become apparent from the following description are accomplished in accordance with the invention, generally speaking, by providing isocyanato phosphorous compounds having the formula $$R_n-\overset{X}{\underset{\|}{P}}-[O-Ar(NCO)_z]_{3-n}$$

wherein X is either oxygen or sulfur, R is an organic radical, such as alkyl, aryl, aralkyl, alkaryl and the like, Ar is an aromatic radical, z is an integer of from 1 to 3 and n is an integer of from 1 to 2. Moreover, this invention provides a process for the preparation of aromatic phosphorous isocyanates which involves reacting an amino phenol which contains no secondary amino groups with a phosphorous acid halide including phosphonic, thiophosphonic, phosphinic, and thiophosphinic acid halides to prepare the corresponding amine or amine hydrochloride which is then reacted with phosgene to prepare the isocyanato phosphorous compounds.

Any suitable amino phenol may be used. The amino phenol must not contain any secondary amino groups. The preferred amino phenols have the formula $$HO-Ar-(NH_2)_z$$

wherein z is 1 to 3 and Ar is an aromatic radical.

Examples of amino phenols include those having the general formula

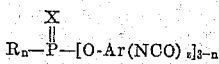

and

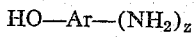

wherein R is hydrogen, alkyl, —O alkyl, chlorine, nitro and the like and more specifically

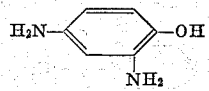

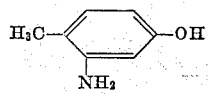

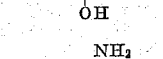

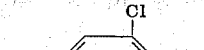

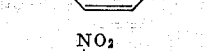

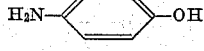

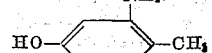

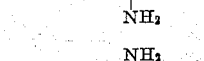

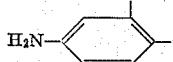

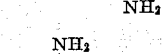

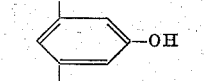

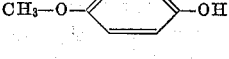

and the like.

Any suitable phosphorous acid halide may be used including phosphonic, thiophosphonic, phosphinic and thiophosphinic acid halides and preferably those having the formula $$R_n-\overset{X}{\underset{\|}{P}}-Y_{3-n}$$

wherein R is an organic radical, n is 1 or 2, X is oxygen or sulfur and Y is halogen. Suitable acid halides are for example,

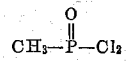

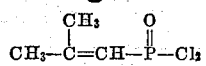
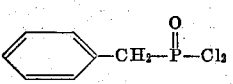
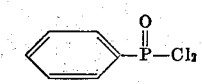
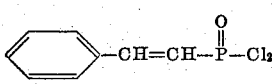
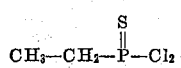
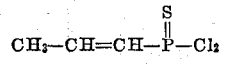
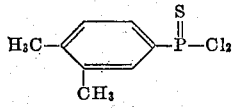
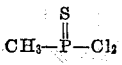
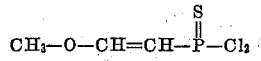
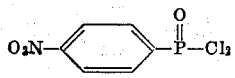
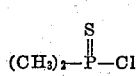
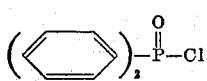
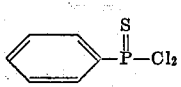
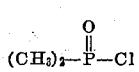
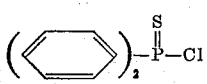
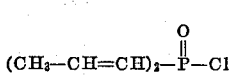
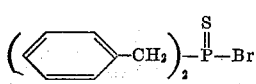
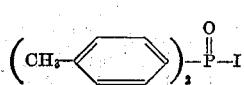
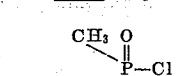
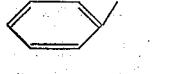

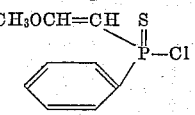

and the like.

The amino phenol is reacted with the phosphorous acid halide preferably in such proportions as to react with all of the halogens in said acid halide and if desired in the presence of an acid acceptor which will remove the acid as it is formed. The amino phenol reacts preferentially with the halides through the hydroxyl radical.

In accordance with a preferred method of practicing the invention an amino phenol is dissolved in an inert organic solvent and then a phosphonic, thiophosphonic, phosphinic or thiophosphinic acid halide is introduced into the resulting solution at a temperature of from about 20° C. to about 100° C. In this way solutions of the amino aryl esters are obtained which can be converted directly into isocyanates by reaction of the amine with phosgene. The phosgenation may be carried out in accordance with any of the well-known methods of industrial phosgenation including the so-called cold phase-hot phase phosgenation, the hydrochloride process wherein the corresponding amine hydrochloride is phosgenated or according to the process disclosed in U.S. Patent 2,860,127. The phosgenation may be carried out in the same inert organic solvent used for reaction with the acid halide with the amino phenol including, for example, such solvents as chlorobenzene, o-dichlorobenzene, nitrobenzene, toluene, benzene, xylylene, trichloroethylene, the diethyl ether of diethylene glycol and the like. The phosgenation may be carried out either continuously or batchwise. In order to produce a good yield, it is preferable not to use too high a temperature in the phosgenation step. For this reason the cold phase-hot phase phosgenation is preferred, wherein the amine is contacted with phosgene at an initial temperature of about −20° C. to about 80° C. and finally reacted with additional phosgene at a temperature of from about 80° C. to about 120° C. In the cold phase-hot phase phosgenation the mixture of carbamic acid chloride and amine hydrochloride is present in such a fine suspension after the initial cold phase phosgenation that the hot phase is completed in a short time.

The isocyanates are usually obtained directly in such pure form that separate purification by recrystallization or distillation is unnecessary. However, a brief heating period of 10 minutes or less under a partial vacuum below the boiling point of the isocyanate or purging with an inert gas at an elevated temperature in order to destroy any carbamic acid chloride which might still be present and/or to remove excess phosgene is preferred.

Any suitable base which will remove the acid as it is formed in the reaction may be used as the acid fixing agent such as, for example, triethylamine, pyridine, dimethylaniline and the like.

It was not to be expected that the acid halides would react with the phenolic hydroxyl group in preference to the primary amino group since it is known that both phenols and aromatic primary amines, for example, aniline, react with the acid halides to produce phosphonic aryl esters, for example, in accordance with U.S. Patents 2,670,369, 2,668,838, 2,668,839 and 2,668,840 and with aniline to give a monophenyl ester analide. It was to be expected that monoester amides, diamides or polymeric compounds would be formed when the amino phenols were combined with the acid halides. These side reactions are not observed and the reaction products obtained in the initial step can be converted into the corresponding isocyanates in very good yield by reacting them with phosgene.

The isocyanates of the invention are useful for the preparation of polyurethane plastics which are in turn useful for the preparation of foam articles such as sound and thermal insulation, for example in home construction, as well as solid articles such as gear wheels and the like.

The invention is further illustrated by the following examples in which the parts are by weight unless otherwise indicated.

*Example 1*

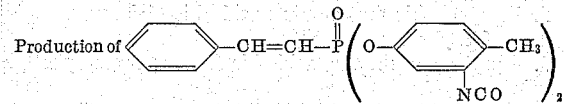

A solution of about 110.5 grams of styryl phosphonic acid dichloride in about 300 ml. of chlorobenzene is added dropwise to a solution of about 123 grams of 3-amino-p-cresol and about 105 grams of triethylamine in about 1 liter of chlorobenzene at about 40° C. to about 60° C. After the exothermic reaction has subsided the mixture is stirred for approximately an hour at about 50° C. The product is then filtered off with suction from the precipitated triethylamine hydrochloride and the solution is concentrated under partial vacuum. The major part of the styryl phosphonic acid bis-(3-amino-4-methylphenyl ester) which is formed crystallizes out in the form of colorless crystals. The separated crystals are suction-filtered and the mother liquor is evaporated to dryness under partial vacuum. An additional quantity of the crystalline ester is isolated by adding a little methanol to the oily residue and then filtering the latter. A total of about 158 grams of styryl phosphonic acid bis-(3-amino-4-methylphenyl ester) having a melting point of about 152° C. to about 154° C. is obtained, this corresponding to about 80 percent of the theoretical.

Analysis:

|  | C | H | N | P |
|---|---|---|---|---|
| Calculated | 67.0 | 5.85 | 7.1 | 7.9 |
| Found | 66.95 | 6.15 | 6.9 | 7.9 |

About 197 grams (about 0.5 mol) of the ester thus prepared are introduced at about −5° C. into a solution of about 200 grams of phosgene in about 1 liter of chlorobenzene. The mixture is left standing overnight and then phosgene is introduced into the suspension at about 50° C. to about 110° C. until a clear solution is formed. The solution is then blown with nitrogen for some hours at about 50° C. to about 80° C. and finally concentrated by evaporation under partial vacuum. About 209 grams of styryl phosphonic acid bis-(3-isocyanato-4-methylphenyl ester) remain in the residue in the form of a clear yellow oil. The yield corresponds to about 93.5 percent of the theoretical.

Analysis:

|  | C | H | N | P | NCO |
|---|---|---|---|---|---|
| Calculated | 64.6 | 4.25 | 6.9 | 6.95 | 18.85 |
| Found | 64.21 | 4.29 | 6.15 | 6.95 | 19.42 |

*Example 2*

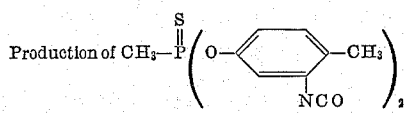

A solution of about 75 grams of methyl thiophosphonic acid dichloride in about 250 ml. of chlorobenzene is added dropwise to a solution of about 125 grams or 3-amino-p-cresol, about 102 grams of triethylamine and about 1 liter of chlorobenzene at about 40° C. to about 50° C. The reaction mixture is stirred for about 1 hour at about 50° C. and filtered.

The solution of the resulting methyl thiophosphonic acid bis-(3-amino-4-methyl-phenylester) is introduced dropwise into a solution of about 200 grams of phosgene in about 750 ml. of chlorobenzene. The suspension is allowed to stand overnight and phosgene is then introduced thereinto at about 80° C. to about 110° C. until a clear solution is formed. The resulting clear solution is blown for about 3 to about 4 hours with nitrogen and finally concentrated by evaporation under partial vacuum. The residue consists of about 148 grams of methyl thiophosphonic acid bis-(3-isocyanato-4-methyl-phenylester). The product is a brown oil.

Analysis:

|  | C | H | N | P | S |
|---|---|---|---|---|---|
| Calculated | 54.6 | 4.0 | 7.5 | 8.3 | 8.5 |
| Found | 53.95 | 4.0 | 7.4 | 8.05 | 7.9 |

*Example 3*

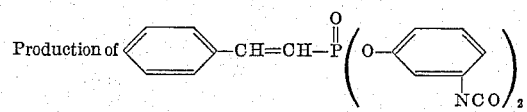

A solution of about 55.5 grams of styryl phosphonic acid dichloride in about 100 ml. of chlorobenzene is added to a solution of about 55 grams of m-aminophenol and about 55 grams of triethylamine in about 500 ml. of chlorobenzene at about 30° C. to about 40° C. The reaction mixture is stirred for about 2 hours at about 40° C. to about 50° C. and then filtered. When the filtrate is worked up in a manner analogous to that of Examples 1 and 2, styryl phosphonic acid bis-(3-amino-phenylester) is obtained in the form of colorless crystals having a melting point of about 130° C.

Analysis:

|  | C | H | N | P |
|---|---|---|---|---|
| Calculated | 65.6 | 5.2 | 7.65 | 8.45 |
| Found | 64.8 | 5.4 | 7.50 | 8.40 |

The corresponding isocyanato aryl ester is formed by reacting the aminoaryl ester thus prepared with phosgene as described in Examples 1 and 2.

*Example 4*

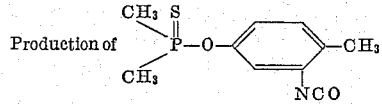

About 37 grams of 3-amino-p-cresol and about 31 grams of triethylamine are dissolved in about 250 ml. of toluene. About 38.5 grams of dimethylthiophosphinic acid chloride are added dropwise to this solution at about 50° C. to about 60° C. The reaction mixture is stirred for about 2 hours at about 50° C. and then filtered. About 44.5 grams of dimethylthiophosphinic acid-3-amino-4-methylphenyl ester are obtained in the form of yellowish crystals having a melting point of about 86° C. by concentrating the filtrate by evaporation. The yield corresponds to about 69 percent of the theoretical.

Analysis:

|  | C | H | N | P | S |
|---|---|---|---|---|---|
| Calculated | 50.25 | 6.5 | 6.5 | 14.4 | 14.9 |
| Found | 50.70 | 6.56 | 6.45 | 14.05 | 14.7 |

The aminoaryl ester thus prepared can be converted into the corresponding isocyanatoaryl ester in higher yield by the procedure described in Examples 1 and 2.

It is to be understood that the foregoing examples are given for the purpose of illustrating the process of carrying out the present invention and that many other suitable phosphonic, thiophosphonic, phosphinic or thiophosphinic acid halides, amino phenols and the like could have been used.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Isocyanato phosphorous compounds having the formula

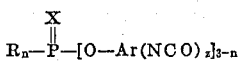

wherein X is selected from the group consisting of oxygen and sulfur, R is an organic radical, Ar is an aromatic radical free of secondary amino groups, $n$ is an integer of 1 to 2 and $z$ is an integer of from 1 to 3.

2. The isocyanato phosphorous compounds of claim 1 wherein the organic radical, R, is selected from the group consisting of alkyl, aryl, aralkyl and alkaryl.

3. The isocyanato phosphorous compounds of claim 1 wherein the aromatic radical Ar, contains only one benzene ring.

4. Styryl phosphonic acid bis-(3-isocyanato-4-methyl phenyl ester).

5. Methyl thiophosphonic acid bis-(3-isocyanato-4-methyl phenyl ester).

6. Styryl phosphonic acid bis-(3-isocyanato phenyl ester).

7. Dimethylthiophosphinic acid 3-isocyanato-4-methyl phenyl ester.

References Cited in the file of this patent

UNITED STATES PATENTS 2,959,582     Schimmelschmidt et al. ____ Nov. 8, 1960
3,013,048     Holtschmidt _____ Dec. 12, 1961